(No Model.)
G. W. STEWART.
STEAM ENGINE.
No. 376,271.  Patented Jan. 10, 1888.
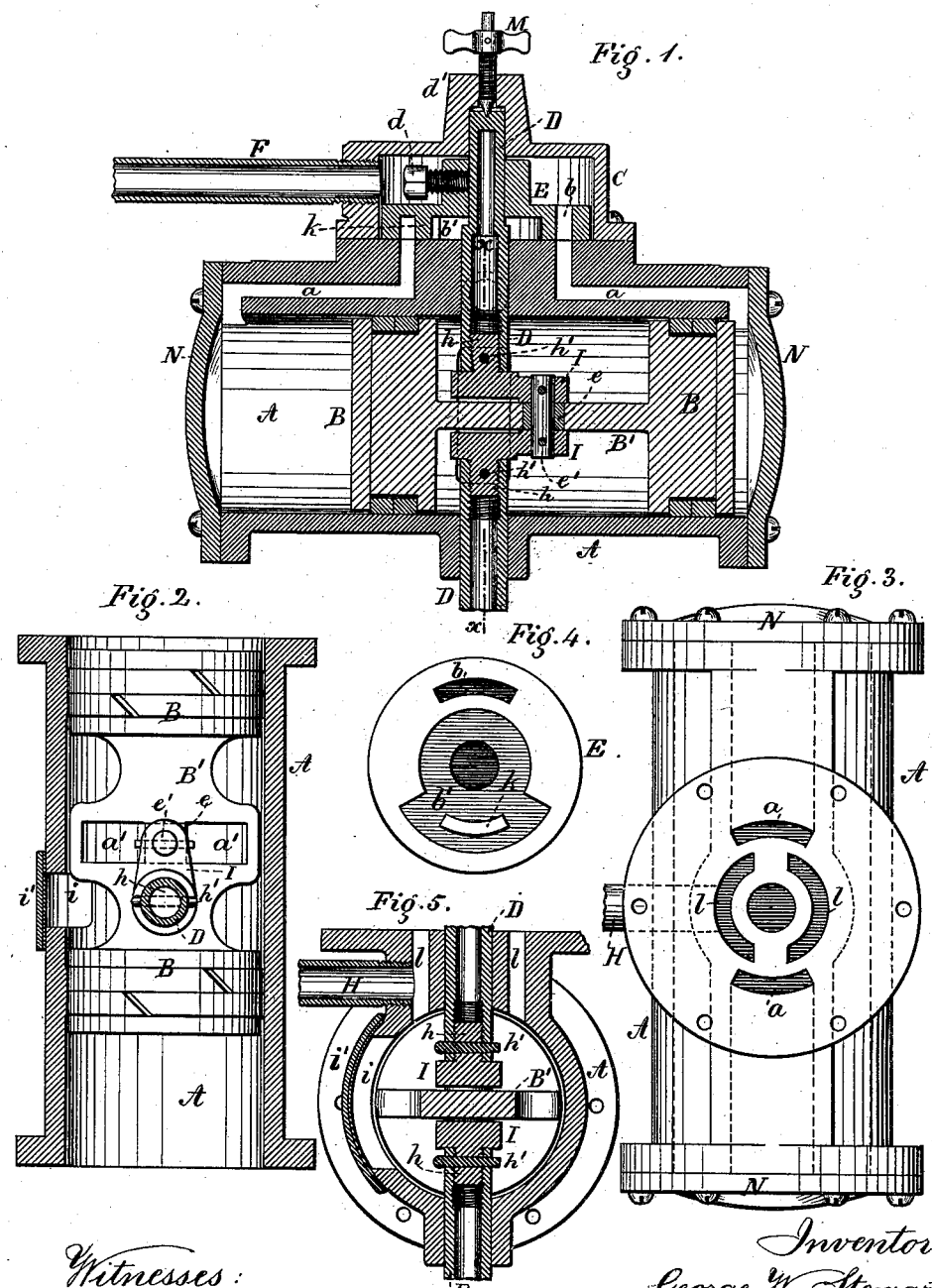
Witnesses:
J. Staib
Chas H. Smith
Inventor:
George W. Stewart
per Lemuel W. Serrell
Atty

UNITED STATES PATENT OFFICE.

GEORGE W. STEWART, OF NEW YORK, N. Y., ASSIGNOR TO BENJAMIN F. MOSHER, OF SAME PLACE.

STEAM-ENGINE.

SPECIFICATION forming part of Letters Patent No. 376,271, dated January 10, 1888.

Application filed March 9, 1887. Serial No. 230,309. (No model.)

*To all whom it may concern:*

Be it known that I, GEORGE W. STEWART, of the city, county, and State of New York, have invented a new and useful Improvement in Steam-Engines; and the following is declared to be a description of the same.

My invention relates to improvements in reciprocating steam-engines in which the cylinder is provided with a double piston acted upon alternately at each end, and in which the crank-shaft is placed directly through the cylinder and piston, and is fitted to a sliding box working in a transverse slideway in the piston, so that the piston acts upon the crank direct.

My invention consists in the combination, in such an engine, with the cylinder, crank, and a sliding box fitting the crank, of a two-part crank-shaft connected at each side to hubs upon the crank, said crank shaft at one end passing through the cylinder and having upon it a belt-pulley, and at the other end passing through the cylinder and steam-chest and having upon it a valve of peculiar form, which can be revolved with the crank-shaft, and which will alternately open the opposite steam and exhaust ports as required for the operations of the piston.

My invention also relates to the means employed by which the parts are put together.

In the drawings, Figure 1 is a vertical longitudinal section of my improved engine. Fig. 2 is a cross-section of the cylinder and plan view of the piston and crank. Fig. 3 is a plan of the cylinder and valve-seat, showing the exhaust and steam ports and exhaust-pipe. Fig. 4 is an inverted view of the valve, and Fig. 5 is a cross-section at the line *x x* of Fig. 1.

The cylinder A is of ordinary construction, and can be secured to a frame-work or mounted upon a foundation, and it may occupy a vertical or horizontal position, as desired.

The double piston B B is preferably cast in one piece with a connecting bridge piece, B', through which a transverse slot, *a'*, is made to receive the sliding box *e*, through which the crank-pin *e'* passes, and is connected at its ends to the arms of the crank I, and there are screw-threaded hubs *h* on the crank-arms I.

The crank-shaft D, I prefer to construct in hollow sections, as shown in Figs. 1, 2, and 5—viz., two pieces of hollow shaft of the required length are each threaded upon the inside at one end, said thread corresponding with those upon the hubs *h*. The thread on one hub *h* should be cut "right," on the other hub "left," and the threads of the hollow shafts accordingly. This permits the parts to be screwed to place in such a manner that they are not unscrewed by the movement of the crank.

One end of the two-part crank-shaft passes through the cylinder A and carries the driving-pulley, as usual. The other end of the two-part crank-shaft passes through the cylinder and steam-chest, but not through the case of said steam-chest, and upon said shaft is the circular steam-valve E, described later on.

In the side of the cylinder A there is an opening at *i*, which is covered with a plate, *i'*, bolted to the cylinder exterior.

The engine is put together as follows: The heads N of the cylinder and the case C, forming the steam chest, being removed, also the plate *i'*, the double piston B B and crank I, with its sliding bearing and adjacent parts, are slipped into the cylinder A. The hollow crank-shafts D are now passed through the cylinder and screwed to place on the hubs *h* and through the opening *i*. The pins *h'* are passed into holes through the hub *h* and crank-shafts D to key the parts together and insure their not turning. The plate *i'* and heads N are now put in place. The circular valve E has a steam-port, *b*, cut clean through it, and is hollowed out at *b'* upon the under side to provide an exit for the exhaust. There is a block or bridge-piece, *k*, made with the valve E and upon the face of the depression *b'*, and its use is to form upon the valve an additional bearing-surface for wear, said block bearing, during the revolution of the valve, against the face of the seat between the steam and exhaust ports, and its use is also to cause the exhaust-steam to pass around it and escape into the exhaust less freely and to hold the escaping steam in check, so that the pressure on top of the valve is more or less counterbalanced. This valve E is now put in place and clamped by the bolt *d* to the hollow shaft D, and the valve-case C is secured in place, the boss *d'* of this case acting as a bearing for the extreme end of the shaft D, and the screw M acting to keep the valve up to its seat and adjust it in this manner for wear.

The ports $a$ $a$ are for steam and connect the opposite ends of the cylinder with the steam-chest, and the ports $l$ $l$ are for the exhaust, and they pass through the cylinder, communicating with the interior of said cylinder between the piston-heads B B, and they also connect with the exhaust-pipe H. The steam-ports $a$ $a$ and exhaust-ports $l$ $l$ are arcs of circles around the shaft D, their common center, and the ports $a$ $a$ and $l$ $l$ are diametrically opposite each other in pairs, as will be seen in Fig. 3.

In the position shown in Fig. 1 steam is admitted by pipe F to the steam-chest, and by ports $b$ and $a$ it passes to the end of the cylinder and moves the pistons B B, the exhaust at the same time passing from the other end of the cylinder by ports $a$ $b'$ $l$ $l$ and away by the pipe H, and the operations are thus alternately repeated.

The principal parts of my invention, as herein described, are the circular revolving valve and the peculiar construction of the crank and its shaft.

I claim as my invention—

1. The combination, with the shaft D and the circular valve E, having a steam-port, $b$, and depression $b'$ for the passage of exhaust-steam, and the bridge-piece $k$ upon the face of the depression, of the valve-seat through which the shaft D passes, said valve seat having steam-ports $a$ $a$ and exhaust-ports $l$ $l$, said ports being arcs of circles around the shaft D, and being diametrically opposite each other in pairs, substantially as specified.

2. The combination, in a steam-engine, with the pistons B B and a slotted bridge, B', connecting the same, of the crank-arms I, their threaded hubs $h$, the sliding box $e$, and crank-pin $e'$, the hollow threaded two-part shaft D, adapted to be screwed on the hubs $h$, and the pins $h'$, for additionally securing the parts together, and a valve for admitting steam, substantially as specified.

3. The combination, in a steam-engine, with the pistons and a slotted bridge connection between the same, of a crank, hubs upon the arms of said crank, a two part shaft passing through the cylinder, and means, substantially as specified, for connecting the crank-arms and shaft, and a circular revolving valve in the steam-chest, substantially as specified.

In testimony that I claim the foregoing as my invention I have signed my name, in presence of two witnesses, this the 7th day of March, 1887.

GEO. W. STEWART.

Witnesses:
OLLIE ANDERSON,
MORTIMER J. ENNIS.